Patented July 11, 1933

1,917,414

UNITED STATES PATENT OFFICE

ARTHUR WOLFRAM, OF FRANKFORT-ON-THE-MAIN-RODELHEIM, AND EMIL HAUSDÖRFER, OF HOFHEIM IN TAUNUS, GERMANY, ASSIGNORS TO GENERAL ANILINE WORKS, INC., OF NEW YORK, N. Y., A CORPORATION OF DELAWARE

PROCESS OF PREPARING DIPHTHALOYLNAPHTHALENE COMPOUNDS AND NEW COMPOUNDS OBTAINABLE THEREBY

No Drawing. Application filed April 24, 1930, Serial No. 447,106, and in Germany May 3, 1929.

The present invention relates to a process of preparing diphthaloylnaphthalene compounds and to new compounds obtainable thereby.

Our process comprises treating a compound of the general formula:

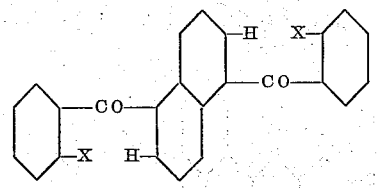

wherein X represents a cyano or carboxylic acid group and wherein the aromatic nuclei may be substituted with concentrated sulfuric acid as an acid condensing agent.

When using mild conditions of reaction our process yields compounds of the general formula:

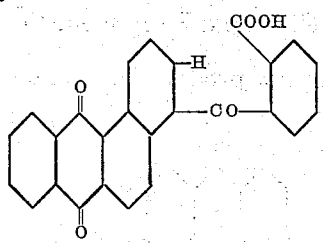

wherein the aromatic nuclei may be substituted.

When using stronger conditions of reaction the process goes farther and compounds of the following general formula are obtainable;

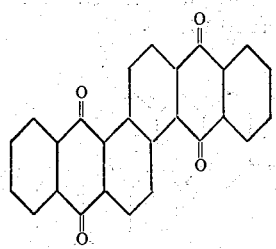

wherein the aromatic nuclei may be substituted.

We prefer to use as the acid condensing agent sulfuric acid which may have different degrees of concentration.

Under milder conditions of reaction we understand for instance a treatment of the reaction compounds in a sulfuric acid solution of about 75% strength while avoiding any heating above the boiling point. As stronger conditions of reaction we designate for instance the heating of the reaction mass in a sulfuric acid of about 95–96% strength up to a temperature of about 150–160° C.

The new compounds obtainable by our new process may be represented by the following general formula:

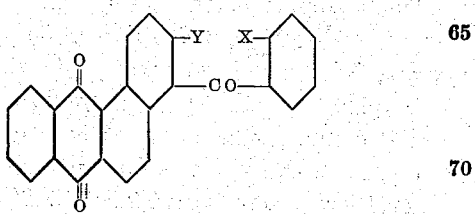

wherein either Y represents hydrogen in which case X stands for the carboxylic acid group or Y and X represents jointly the group —CO— and wherein the aromatic nuclei may be substituted.

The following examples illustrate the invention, but they are not intended to limit it thereto, the parts being by weight:

(1) 1 part of 2′.2″-dinitrilo-1.5-dibenzoylnaphthalene, melting at 257° C. is dissolved in 10 parts of sulfuric acid of 95–96% strength. The solution thus obtained is heated for a short time to about 150° C.–160° C. When diluting it with water, the 1.2.5.6-diphthaloylnaphthalene precipitates in the form of yellow, metallically shining needles or laminæ.

1.2.5.6-diphthaloylnaphthalene dissolves in sulfuric acid with a reddish orange coloration and recrystallizes from nitrobenzene. It melts at about 410° C.

(2) 1 part of 2'.2''-dinitrilo-1.5-dibenzoylnaphthalene is dissolved in 10 parts of sulfuric acid of 75% strength. The solution thus obtained is heated to boiling for a short time and diluted with water and there is obtained the light yellow 2'-carboxybenzoyl-naphthanthraquinone which dissolves in alkali to a nearly colorless solution and yields with hydrosulfite a brown vat.

The ring closure of 2'-carboxybenzoyl-naphthanthraquinone into 1.2.5.6-diphthaloylnaphthalene is effected by heating it in sulfuric acid of 95%-96% strength to 160° C.

(3) By heating 2'-2''-dinitrilo-1.5-dibenzoylnaphthalene in sulfuric acid of 75% strength to a temperature below the boiling point, saponification into 1.5-naphthalenedibenzoyl-2'.2''-dicarboxylic acid takes place. By treating this acid with sulfuric acid of 95-96% strength in a manner analogous to that of Example 1, there is likewise obtained 1.2.5.6-diphthaloylnaphthalene.

(4) 1.5-naphthalenedibenzoyl-2'.2''-dicarboxylic acid may be condensed, just as 2'.2''-dinitrilo-1.5-dibenzoyl-naphthalene, into 2'-carboxybenzoyl-naphthanthraquinone and converted into 1.2.5.6-diphthaloylnaphthalene as described in Example 2.

(5) 1 part of 2'.2''-dinitrilo-5'.5''-dichloro-1.5-dibenzoyl-naphthalene is dissolved in 10 parts of sulfuric acid of 82% strength. The solution thus obtained is heated to boiling for a short time. On dilution with water, there precipitates 1.2.5.6-(2'.2''-dichlorodiphthaloyl)-naphthalene of the following formula:

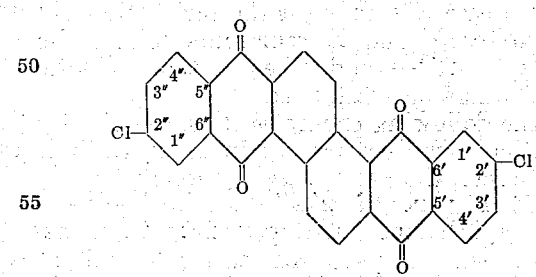

The yellow 1.2.5.6-(2'.2''-dichlordiphthaloyl)-naphthalene dissolves in concentrated sulfuric acid with a reddish orange coloration and is capable of yielding a brown vat. It melts at temperatures above 400° C.

We claim:

1. The process which comprises heating a compound of the general formula:

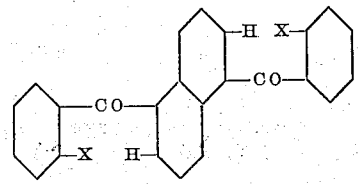

wherein X stands for the cyano or carboxylic acid group in the presence of sulfuric acid.

2. The process which comprises heating a compound of the general formula:

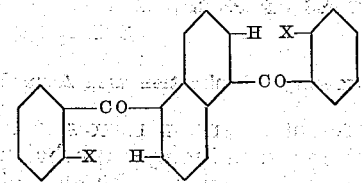

wherein X stands for the cyano or carboxylic acid group in the presence of sulfuric acid of about 75 to 96% strength.

3. As new products the compounds of the general formula:

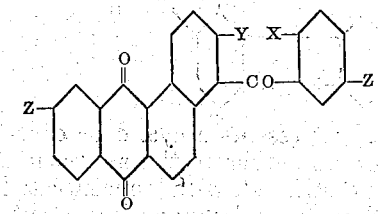

wherein either Y represents hydrogen in which case X stands for the carboxylic acid group or Y and X represent jointly the group —CO— and Z represents hydrogen or chlorine.

4. As a new product, the compound of the formula:

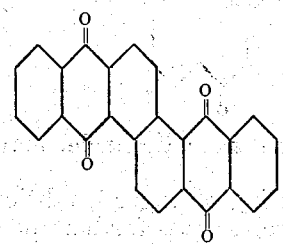

5. As a new product the compound of the probable formula:

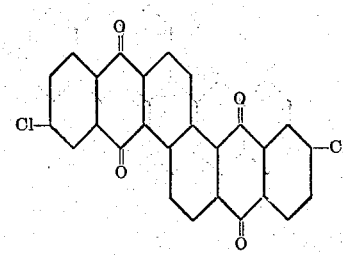

forming in the dry state a yellow powder which dissolves in concentrated sulfuric acid with a reddish orange coloration and which is capable of yielding a vat having a brown coloration.

6. The process which comprises heating at a temperature of about 150° C.–160° C. for a short time a solution of 2.2′-dinitrilo-1.5-dibenzoylnaphthalene in sulfuric acid of 95 to 96% strength.

7. The process which comprises heating to boiling for a short time a solution of 2.2′-dinitrilo-1.5-dibenzoylnaphthalene in sulfuric acid of 75% strength.

8. As a new product, the compound of the probable formula:

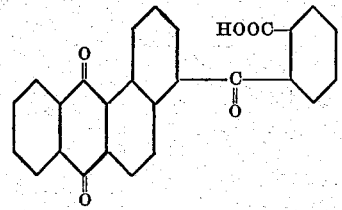

dissolving in alkali to a nearly colorless solution.

In testimony whereof, we affix our signatures.

ARTHUR WOLFRAM.
EMIL HAUSDÖRFER.